(12) United States Patent
Kudlaty et al.

(10) Patent No.: US 9,354,093 B2
(45) Date of Patent: May 31, 2016

(54) METHOD FOR DETERMINING THE FLOW RATE OF FLUIDS USING THE ULTRASONIC TRANSIT TIME METHOD

(75) Inventors: Katarzyna Kudlaty, Gössendorf (AT); Michael Wiesinger, Graz (AT); Stefan Nohammer, Graz (AT); Klaus Witrisal, Graz (AT); Gernot Kubin, Graz (AT)

(73) Assignee: AVL List GmbH, Graz (AT)

( * ) Notice: Subject to any disclaimer, the term of this patent is extended or adjusted under 35 U.S.C. 154(b) by 74 days.

(21) Appl. No.: 14/128,360

(22) PCT Filed: Jun. 19, 2012

(86) PCT No.: PCT/EP2012/061703
§ 371 (c)(1),
(2), (4) Date: Apr. 1, 2014

(87) PCT Pub. No.: WO2012/175493
PCT Pub. Date: Dec. 27, 2012

(65) Prior Publication Data
US 2014/0216166 A1    Aug. 7, 2014

(30) Foreign Application Priority Data
Jun. 24, 2011 (AT) .................. A 930/2011

(51) Int. Cl.
*G01F 1/66* (2006.01)
*G01F 25/00* (2006.01)

(52) U.S. Cl.
CPC *G01F 1/662* (2013.01); *G01F 1/66* (2013.01); *G01F 1/668* (2013.01); *G01F 25/0007* (2013.01)

(58) Field of Classification Search
CPC ........................................ G01F 1/66

USPC .......................... 73/861.27–861.29
See application file for complete search history.

(56) References Cited

U.S. PATENT DOCUMENTS

| 4,486,862 A | 12/1984 | Wyber | |
|---|---|---|---|
| 5,146,414 A | 9/1992 | McKown et al. | |
| 5,163,331 A * | 11/1992 | Gill | G01F 1/662 73/861.28 |
| 6,390,999 B1 * | 5/2002 | Zscheile | A61M 1/3626 604/4.01 |

(Continued)

FOREIGN PATENT DOCUMENTS

| DE | 19815199 A2 | 10/1999 |
|---|---|---|
| DE | 102005037458 | 2/2007 |

(Continued)

OTHER PUBLICATIONS

English Abstract of DE102005037458.

(Continued)

*Primary Examiner* — Jewel V Thompson
(74) *Attorney, Agent, or Firm* — Dykema Gossett PLLC

(57) ABSTRACT

In a method for determining the flow rate of fluids using the ultrasonic transit time method, the flow speed and therefrom the flow rate of the fluid is determined from the transit time of ultrasound signals through the measurement section. In order to take into account the change in the transmission function of the ultrasonic converters, which change acts as a drift of the measurement variable, the transmission function of the measurement section is determined at least approximately, and at least one ultrasonic transit time is corrected by means of a correction value that is determined from the group transit time of the transmission function.

16 Claims, 1 Drawing Sheet

(56) References Cited

U.S. PATENT DOCUMENTS

Figure 1:
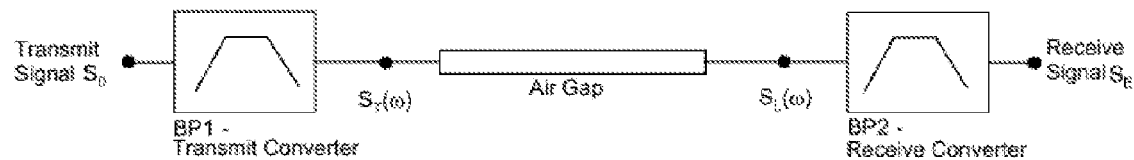

| | | | |
|---|---|---|---|
| 6,595,071 B1 * | 7/2003 | Doten | A61B 8/06 73/861.29 |
| 6,601,458 B1 | 8/2003 | Gysling et al. | |
| 7,093,502 B2 * | 8/2006 | Kupnik | G01F 1/662 73/861.27 |
| 7,423,931 B2 | 9/2008 | Martin, II et al. | |
| 7,720,617 B2 | 5/2010 | Wang et al. | |
| 7,984,637 B2 | 7/2011 | Ao et al. | |
| 8,079,383 B2 | 12/2011 | Ding | |
| 2004/0074312 A1 | 4/2004 | Gysling | |
| 2006/0144148 A1 | 7/2006 | Gysling et al. | |
| 2008/0282808 A1 | 11/2008 | Trieu et al. | |
| 2009/0025487 A1 | 1/2009 | Gysling et al. | |
| 2010/0095782 A1 * | 4/2010 | Ferencz | G01F 1/66 73/861.28 |
| 2014/0236533 A1 * | 8/2014 | Drachmann | G01F 1/667 702/176 |

FOREIGN PATENT DOCUMENTS

| | | |
|---|---|---|
| DE | 102008027489 | 12/2009 |
| DE | 102009045620 | 5/2011 |
| EP | 0077285 A2 | 4/1983 |
| JP | 01096514 | 4/1989 |
| JP | H11248536 | 9/1999 |
| JP | 2005351695 | 12/2005 |
| JP | 2006184036 | 7/2006 |
| JP | 2007298503 | 11/2007 |
| JP | 2008507693 | 3/2008 |
| JP | 2008164465 | 7/2008 |
| WO | 2006019487 | 2/2006 |
| WO | 2007089412 A2 | 8/2007 |

OTHER PUBLICATIONS

English Abstract of DE 102008027489.
English Abstract of DE 102009045620.
English Abstract of JP 2006184036.
English Abstract of JP H11248536.
English Abstract of JP 2008507693.
English Abstract of JP 2008164465.
English Abstract of JP 01096514.
English Abstract of JP 2005351695.
English Abstract of JP 2007298503.
Smith, J. O. "Group Delay," in *Introduction to Digital Filters with Audio Applications*, http://ccrma.stanford.edu/njos/filters/Partial_Fraction_Expansion.html, online book, 2007 edition, accessed Dec. 4, 2014.
English Language Abstract of EP 0077285 (A2) (Apr. 20, 1983).
English Language Abstract of DE 19815199 (A2) (Oct. 14, 1999).
English Language Abstract of WO 2007089412 (A2) (Aug. 9, 2007).

* cited by examiner

METHOD FOR DETERMINING THE FLOW RATE OF FLUIDS USING THE ULTRASONIC TRANSIT TIME METHOD

The invention relates to a method for determining the flow rate of fluids using the ultrasonic transit time method, wherein the flow speed and therefrom the flow rate of the fluid rate is determined from the transit time of ultrasonic signals through the measurement section, wherein the transmission function of the measurement section is determined at least approximately.

Nowadays, ultrasonic sensor systems for measuring the volume and mass flow rate based on the transit time method can be regarded as established high-precision measurement technology. The achievable accuracy of such measurement devices is determined by the influences of the transmission system, which influences, in the case of an system that is invariant in terms of time, can be eliminated by calibration.

In the application of flow rate measurement, the reasons for change in the transmission function of the ultrasonic converters can be manifold (such as, for example, contamination, air humidity or aging processes of the materials). The changing transmission functions act as a drift of the measurement variable.

In this connection, DE 10 2005 037 458 A1 shows a possibility to compensate this drift by measuring an electrical parameter such as, for example, the voltage dropping at the ultrasound converter. Subsequently, from this signal, a correction variable is derived, which can be used for compensating the drift of the ultrasonic sensor.

It was an object of the invention to provide an improved method by means of which this drift can be taken into account and therefore the measurement results can be improved.

In order to achieve this object, it is provided according to the invention that at least one ultrasonic transit time is corrected by means of a correction value determined from a group transit time of the transmission function.

Advantageously, the correction value is regularly determined during operation.

According to a further embodiment variant of the invention it is provided that the transmission function is approximated by determining the electrical impedance of the ultrasonic converter at least at three frequency points.

A further variant of the invention is characterized in that the transmission function is determined from the FFT of the receive signal.

Alternatively, the transmission function could be determined from the FFT of the correlation between the receive signal and the transmit signal.

According to the invention, it can be provided that a theoretical model of the transmission function is formed, and the model parameters are determined by means of the fitting method.

An advantageous embodiment variant of the invention provides that the actual distance between the sensors is calculated by multiplying the corrected transit time by a sound velocity that is determined from an accurate temperature measurement.

It is particularly advantageous here if the actual distance between the sensors is regularly determined during operation.

In the following description, the invention is to be explained in more detail by way of example with reference to the accompanying drawings.

FIG. 1 shows schematically the transmission path of an ultrasonic pulse, and FIG. 1 is an illustration of the transit time errors caused by the change in the transmission function of the ultrasonic converters.

According to FIG. 1, the measurement section can be represented with the following components: Band-pass filter BP1 (transmit converter), air gap and band-pass filter BP2 (receive converter). Here, S0 designates the FFT of the transmit signal, ST the FFT of the transmitted signal, SA the FFT of the signal downstream of the air gap and before entering the receive converter, and SR designates the FFT of the received signal (downstream of the filter BP2). FFT is the abbreviation for "Fast Fourier Transform". The FFT is an algorithm for efficiently calculating the values of a discrete Fourier transform, wherein in contrast to the direct calculation, previously calculated intermediate results are taken into account and arithmetic operation can be saved in this manner.

Various methods are known that can be used for determining the transit time such as, for example, the triggering method, the use of the phase determination, or the correlation method. With these methods, a mean signal transit time is determined, which results from the overall transmission function of the individual components.

$$t_{meas} = t_{air} + t_{BP1} + t_{BP2}$$

Here, $t_{meas}$ is the measured transit time, $t_{air}$ is the sound transit time in the air gap, $t_{BP1}$ is the signal transit time through the first band-pass filter (group transit time) and $t_{BP2}$ is the group transit time of the second filter.

The measurement variable of the flow rate measurement corresponds to the change in the transmission function of the air gap $A(\omega)$, while potential changes in the transmission functions of the two band-pass filters act as a disturbance variable.

$$S_T(\omega) = S_0(\omega) BP_1(\omega)$$

$$S_A(\omega) = S_T(\omega) A(\omega) = S_0(\omega) BP_1(\omega) A(\omega)$$

$$S_R(\omega) = S_A(\omega) BP_2(\omega) = S_0(\omega) BP_1(\omega) A(\omega) BP_2(\omega)$$

$$S_R(\omega) = S_0(\omega) |BP|_1 e^{j\Phi_{P1}} |BP|_2 e^{j\Phi_{P2}} |1| e^{\Theta t}$$

Here, BP1 and BP2 represent the complex transmission functions of the two band-pass filters with the absolute values |BP1| and |BP2| and the phases $\Phi_1$ and $\Phi_2$.

Figure 2:
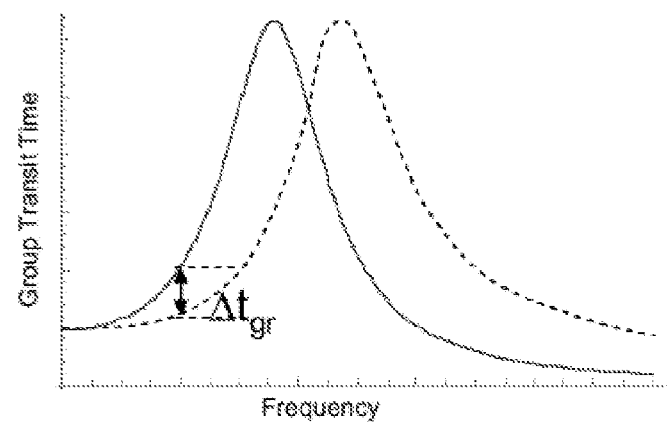

The explanation for this drift is the change in the group transit time of the two band-pass filters as illustrated in FIG. 2. Eliminating this drift via calibration is not possible during the measuring operation, and is possible only as null measurement under precisely controlled ambient conditions.

$$\Delta t = t_{BP1} + t_{BP2} = t_{meas} - t_{air,0,theoretical}$$

$$t_{air} = t_{meas} - \Delta t$$

With this method, the current values of the group transit time of the ultrasonic sensors are determined by a comparison of the measured transit time ($t_{meas}$) with a theoretical sound transit time without disturbance ($t_{air,0,theoretical}$). These correction factors are subsequently subtracted during operation from the measured transit time and therefore the sound transit time in the air gap ($t_{air}$) is determined.

With the method according to the invention, the zero compensation can regularly take place during the measurement operation. For this purpose, the transmission function of the measurement section is determined at least approximately, and at least one ultrasonic transit time is corrected by means of a correction value that is determined from the group transit time of the transmission function. This correction value can be regularly determined during the operation.

For determining the transmission function, there are several possibilities, wherein the transmission function is preferably approximated by determining the electrical impedance of the ultrasonic converter at least at three frequency points, but it can also be determined from the FFT of the receive signal or the FFT of the correlation between the receive signal and the transmit signal. Where applicable, a theoretical model of the transmission function could also be formed, and the model parameters could be determined by means of the fitting method.

In terms of the equipment, it is provided for improving the measurement results that the actual distance between the sensors is calculated by multiplying the corrected transit time by a sound velocity that is determined from a precise temperature measurement. Here too, the actual distance between the sensors can be regularly measured during the operation.

The invention claimed is:

1. A method for determining a flow rate of fluids using the ultrasonic transit time method, comprising the steps of:
   determining the flow speed and therefrom the flow rate of the fluid from transit times of ultrasound signals through a measurement section, the measurement section comprising a plurality of sensors and an air gap,
   determining an approximate transmission function of the measurement section, and
   correcting at least one of the ultrasonic transit times by means of a correction value that is determined from a group transit time of a transmission function of the plurality of sensors.

2. The method according to claim 1, comprising regularly determining the correction value during the operation.

3. The method according to claim 1, comprising calculating an actual distance between the plurality of sensors by multiplying the corrected transit time by a sound velocity that is determined from an accurate temperature measurement.

4. The method according to claim 3, wherein the actual distance between the plurality of sensors is regularly determined during the operation.

5. The method according to claim 1, wherein the plurality of sensors includes an ultrasonic converter and the transmission function is approximated by determining an electrical impedance of the ultrasonic converter at least at three frequency points.

6. The method according to claim 1, comprising determining the transmission function from an FFT of a receive signal.

7. The method according to claim 1, comprising determining the transmission function from the FFT of a correlation between a receive signal and a transmit signal.

8. The method according to claim 1, wherein a theoretical model of the transmission function is formed, and a plurality of model parameters are determined by means of the fitting method.

9. The method according to claim 1, wherein the plurality of sensors includes a transmit converter and a receive converter.

10. The method according to claim 9, wherein the transmit converter includes a band-pass filter.

11. The method according to claim 9, wherein the receive converter includes a band-pass filter.

12. A method for determining a flow rate of fluid using the ultrasonic transit time method, the method of determining the flow rate comprising the steps of:
    determining a flow speed and therefrom the flow rate of the fluid from ultrasonic transit times of ultrasound signals through a measurement section, the measurement section including an ultrasonic converter,
    determining an approximate transmission function of the measurement section, and
    correcting at least one of the ultrasonic transit times via a correction value determined from a group transit time of the ultrasonic converter;
    wherein the approximate transmission function is approximated by determining the electrical impedance of the ultrasonic converter at least at three frequency points.

13. A method for determining a flow rate of fluid, the method comprising:
    determining a flow speed and a flow rate of the fluid from ultrasonic transit times of ultrasound signals through a measurement section, the measurement section including a plurality of sensors and an air gap,
    determining an approximate transmission function of the measurement section,
    determining a correction value according to a group transit time of the plurality of sensors, and
    compensating for a change in a transmission function of the plurality of sensors via correcting at least one of the ultrasonic transit times according to the correction value.

14. The method of claim 13, wherein the transmission function is approximated by determining an electrical impedance of the ultrasonic converters at least at three frequency points.

15. The method of claim 13, wherein the change is caused by at least one of contamination, humidity, and material aging.

16. The method of claim 13, comprising determining a group transit time of the air gap according to the correction value.

* * * * *